US010914218B1

(12) United States Patent
Chapman et al.

(10) Patent No.: US 10,914,218 B1
(45) Date of Patent: Feb. 9, 2021

(54) EXHAUST GAS AFTERTREATMENT SYSTEM WITH MIXING FEATURES

(71) Applicant: Faurecia Emissions Control Technologies, USA, LLC, Columbus, IN (US)

(72) Inventors: Christopher S. Chapman, Columbus, IN (US); John G. Rohde, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/568,892

(22) Filed: Sep. 12, 2019

(51) Int. Cl.
*F01N 3/20* (2006.01)
*F01N 3/24* (2006.01)
*F01N 13/04* (2010.01)
*F01N 3/08* (2006.01)

(52) U.S. Cl.
CPC .......... *F01N 3/208* (2013.01); *F01N 3/0871* (2013.01); *F01N 3/24* (2013.01); *F01N 13/04* (2013.01); *F01N 2610/08* (2013.01); *F01N 2610/14* (2013.01); *F01N 2610/1493* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,312,650 | B1* | 11/2001 | Frederiksen | F01N 3/0335 422/180 |
| 9,920,676 | B2* | 3/2018 | Freeman | F01N 3/2066 |
| 9,976,470 | B2* | 5/2018 | Isada | F01N 13/02 |
| 10,669,912 | B2* | 6/2020 | Shiva | F01N 13/08 |
| 2008/0314033 | A1 | 12/2008 | Aneja et al. | |
| 2010/0242451 | A1* | 9/2010 | Werni | F01N 3/0335 60/297 |
| 2012/0124983 | A1* | 5/2012 | Hong | F01N 3/2066 60/324 |
| 2014/0109557 | A1* | 4/2014 | Calvo | B01F 5/0616 60/301 |

FOREIGN PATENT DOCUMENTS

WO 2015026305 A2 2/2015

* cited by examiner

*Primary Examiner* — Binh Q Tran
(74) *Attorney, Agent, or Firm* — Barnes & Thornburg LLP

(57) ABSTRACT

A vehicle includes an exhaust aftertreatment system for use with an automotive internal combustion engine. The system includes a reagent mixer configured to deliver a reagent for mixing with exhaust gases produced by the engine. The reagent mixer includes a flow-redirection housing defining an mixing chamber and a manifold coupled downstream of the flow-redirection housing. A doser is mounted to the flow-redirection housing and is configured to inject the reagent toward the mixing chamber.

11 Claims, 4 Drawing Sheets

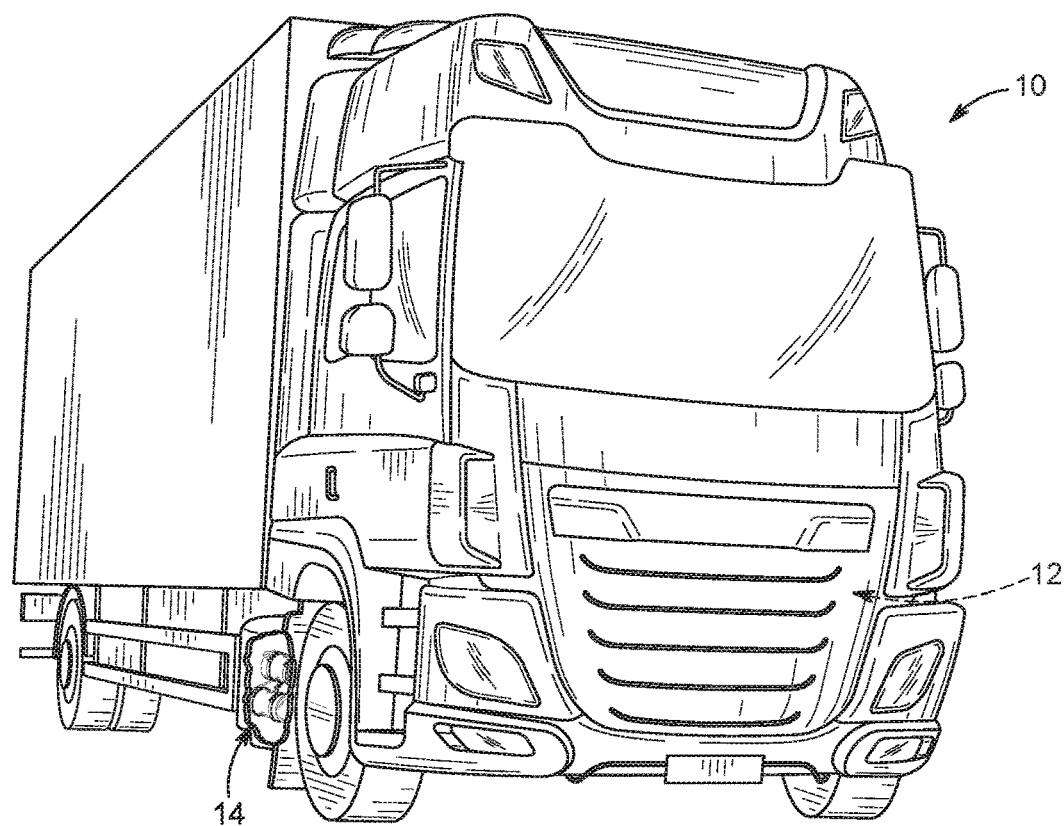
FIG. 1
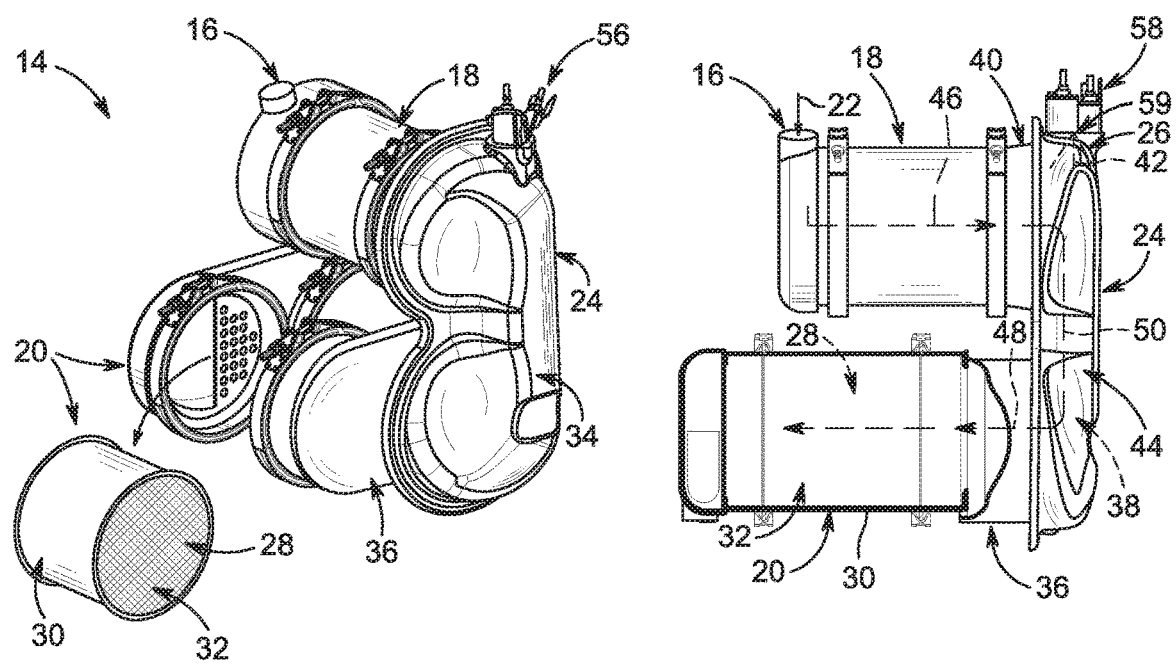
FIG. 2
FIG. 3

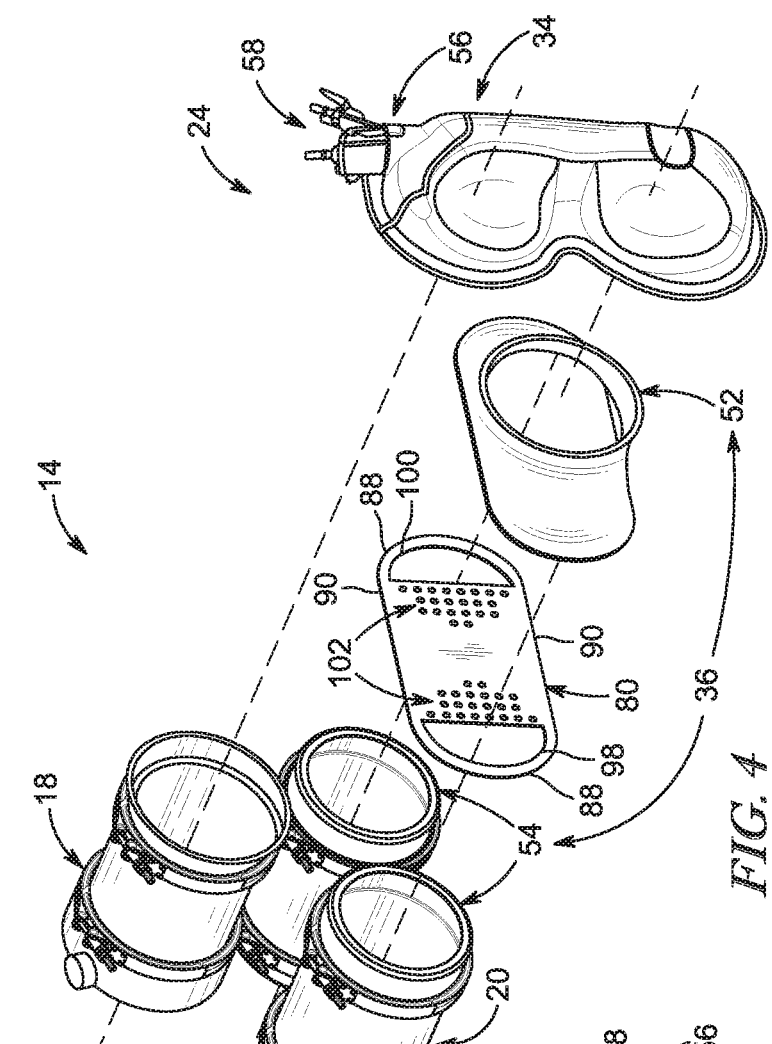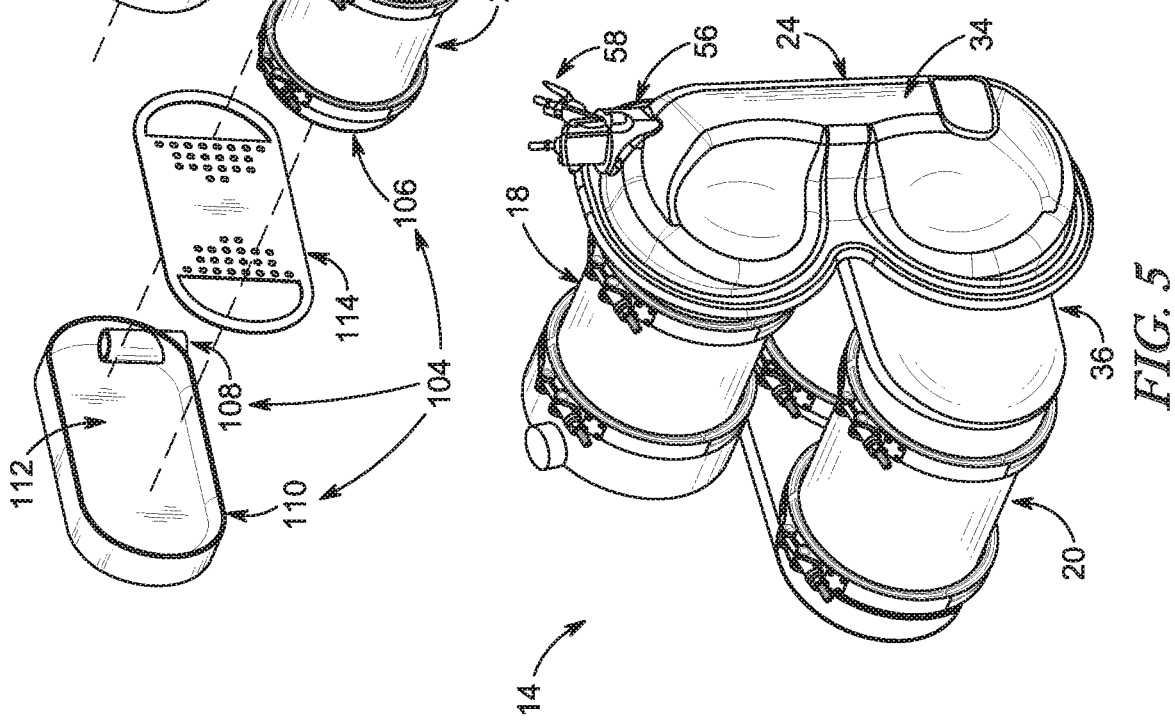

EXHAUST GAS AFTERTREATMENT SYSTEM WITH MIXING FEATURES

BACKGROUND

The present disclosure relates to exhaust aftertreatment systems for treating exhaust gases produced in automotive applications, and particularly to an aftertreatment system for injecting and mixing a reagent into the exhaust gases.

SUMMARY

A vehicle in accordance with the present disclosure includes an engine and an exhaust aftertreatment system in accordance with the present disclosure. The engine combusts fuel and discharges exhaust gases through an exhaust passageway. The exhaust aftertreatment system is configured to reduce various undesired effluents in the exhaust gases, for example, nitrogen oxides (NOx), before the exhaust gases are released to the atmosphere.

In the illustrative embodiment, the exhaust aftertreatment system is a compact unit and includes a selective catalytic reduction unit (SCR) and a reagent mixer mounted upstream of the SCR for injecting and mixing a reagent into a stream of exhaust gases as they enter the reagent mixer. Chemical reaction of the reagent with the exhaust gases occurs downstream of the reagent mixer in the SCR to transform the NOx into molecular nitrogen and water vapor which are not harmful to the environment.

In the illustrative embodiment, the SCR includes multiple catalysts and multiple catalyst housings. Each of the catalysts is received in a respective catalyst passage formed in each of the catalyst housings. Each of the catalysts in the SCR is accessible and removable individually from the aftertreatment system so that they can be serviced and/or replaced without removing or disassembling the aftertreatment system.

The reagent mixer includes a flow-redirection housing and a multi-outlet discharge manifold that interconnects the flow-redirection housing and each of the catalyst housings. The flow-redirection housing is formed to include a mixing chamber where the reagent is mixed with the stream of exhaust gases before being conducted to the SCR by the multi-outlet discharge manifold. The multi-outlet discharge manifold is configured to separate the stream of exhaust gases into a plurality of streams that equals the number of catalysts and catalyst housings.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective view of an automotive vehicle including an internal combustion engine and an exhaust aftertreatment system for treating exhaust gases produced by the engine;

FIG. 2 is a perspective view of the exhaust aftertreatment system of FIG. 1 showing a selective catalytic reduction unit with a plurality of removable catalysts enclosed in catalyst housings and a reagent mixer fluidly upstream of the selective catalytic reduction unit with a multi-outlet discharge manifold interconnecting the selective catalytic reduction unit with the mixer and showing one of the catalysts being removed from the exhaust aftertreatment system for service;

FIG. 3 is a section view taken along line 3-3 in FIG. 2 showing that during use the reagent mixer is configured to receive a stream of exhaust gases along a first axis and discharge the stream of exhaust gases toward the selective catalytic reduction unit along a third axis spaced apart from and parallel with the first axis, and the mixer includes a housing body arranged generally along a second axis perpendicular to the first and third axes to provide a U-shape flow path through the reagent mix of the exhaust aftertreatment system;

FIG. 4 is an exploded assembly view of the exhaust aftertreatment system;

FIG. 5 is a perspective view showing the exhaust aftertreatment system fully assembled;

DETAILED DESCRIPTION

Figure 6:
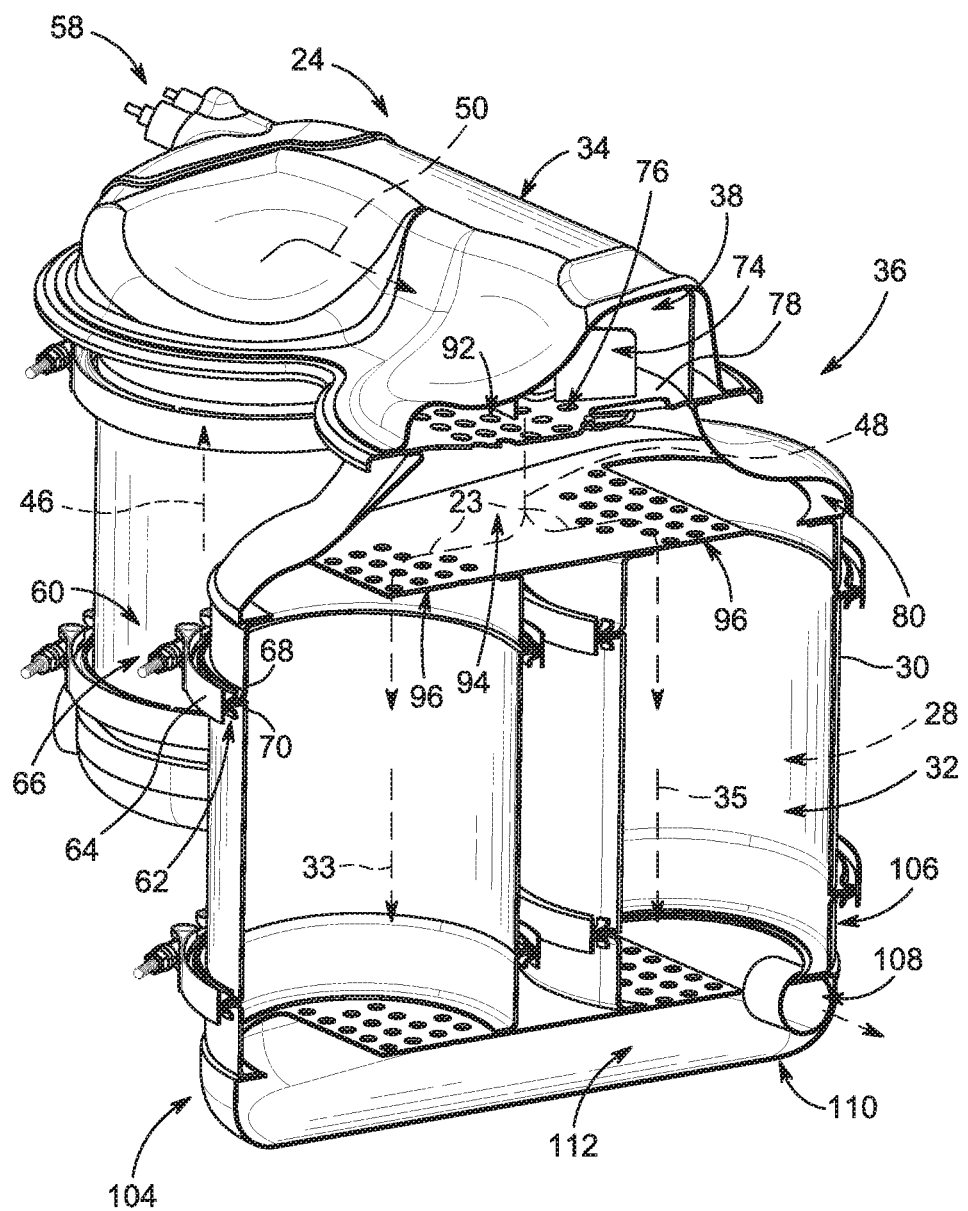
FIG. 6 is a perspective view with a section taken along line 6-6 in FIG. 5 to show the multi-outlet discharge manifold separating the stream of exhaust gases and directing the streams of exhaust gases into fluidly-separate catalyst passages.

An illustrative over-the-road vehicle 10 includes an engine 12 and an exhaust aftertreatment system 14 in accordance with the present disclosure as shown in FIG. 1. The engine 12 is, illustratively, an internal combustion engine combusts fuel and discharges exhaust gases. The exhaust gases are distributed through an exhaust passageway 16, as shown in FIG. 2, treated by the exhaust aftertreatment system 14, and then released into the atmosphere. The exhaust aftertreatment system 14 is configured to reduce various undesired effluents in the exhaust gases, such as nitrogen oxides (NOx), before the exhaust gases are released to the atmosphere.

In the illustrative embodiment, the exhaust aftertreatment system 14 is a compact unit that may include various exhaust aftertreatment devices such as a diesel oxidation catalyst (DOC), a diesel particulate filter (DPF) 18, and a selective catalytic reduction unit (SCR) 20. A stream of exhaust gases 22 interacts with each of the aftertreatment devices to remove or reduce different effluents from the stream of exhaust gases 22.

The exhaust aftertreatment system 14, in the illustrative embodiment, includes a reagent mixer 24 mounted upstream of the SCR 20 as shown in FIGS. 2-5. The reagent mixer 24 is used for injecting and mixing a reagent 26 into the stream of exhaust gases 22 as they enter the reagent mixer 24. Chemical reaction of the reagent 26 with the exhaust gases occurs downstream of the reagent mixer 18 in the SCR 20. The reagent 26 is, illustratively, a urea solution (i.e. Diesel Emission Fluid), however in other embodiments the reagent 26 may be gaseous ammonia or other suitable chemicals.

The SCR 20 includes a plurality of catalysts 28 and a plurality of catalyst housings 30 as shown in FIG. 2. Each of the catalysts 28 is received in a respective catalyst passage 32 formed in the catalyst housings 30. Each catalyst passage 32 is fluidly-separate from one another in the illustrative embodiment. The chemical reactions occur in the catalyst passages 32 in the presence of the catalysts 28 to transform the $NO_x$ into molecular nitrogen and water vapor before the exhaust gases are released in the atmosphere. Each of the catalysts 28 in the SCR 20 is accessible and removable individually so that they can be serviced as suggested in FIG. 2.

The reagent mixer 24 includes a flow-redirection housing 34 and a multi-outlet discharge manifold 36 as shown in FIGS. 2 and 3. The multi-outlet discharge manifold 36 interconnects the flow-redirection housing 34 and each of the catalyst housings 30. The flow-redirection housing 34 is formed to include a mixing chamber 38. The reagent 26 is mixed with the stream of exhaust gases 22 in the mixing chamber 38 before being conducted to the SCR 20 by the multi-outlet discharge manifold 36. The multi-outlet discharge manifold 36 is configured to separate the stream of exhaust gases 22 into a plurality of streams 23 that equals the number of catalysts 28 and catalyst housings 30.

The flow-redirection housing 34 includes a housing inlet 40 and a housing body 44 as shown in FIGS. 2 and 3. The stream of exhaust gases 22 are directed into the mixing chamber 38 through the housing inlet 40 generally along a first axis 46. The reagent 26 is injected into the mixing chamber 38 directly adjacent to where the stream of exhaust gases 22 enters the mixing chamber 38. The stream of exhaust gases 22 and the reagent 26 are mixed in the mixing chamber 38 and then discharged from the housing body 44 generally along a third axis 48 into the multi-outlet discharge manifold 36. The third axis 48 is spaced apart from and parallel with the first axis 46. The housing body 44 extends generally along a second axis 50 that is perpendicular to both the first axis 46 and the third axis 48.

The flow-redirection housing 34 provides a U-shape flow path when viewed from the side, as shown in FIG. 3. The U-shape flow path extends from the housing inlet 40 to the multi-outlet discharge manifold 36 and is defined by the first, second and third axes 46, 50, 48, and/or generally in the direction of axes 46, 50, 48. Providing a U-shape flow path minimizes package space in the vehicle 10 while the multi-outlet discharge manifold 36 allows each catalyst 28 in the SCR 20 in the illustrative embodiment to be serviced.

The multi-outlet discharge manifold 36 includes a manifold inlet 52 coupled to the flow-redirection housing 34 and a plurality of manifold outlets 54 configured to separate the stream of exhaust gases into the plurality of fluidly-separate streams 23 as shown in FIGS. 4 and 6. The manifold inlet 52 is configured to receive the stream of exhaust gases 22 discharged from the multi-outlet discharge manifold 36 along the third axis 48. Each of the plurality of manifold outlets 54 is coupled to a corresponding catalyst housing 30. In the illustrative embodiment, the SCR 20 includes a pair of catalysts 28 enclosed in a corresponding pair of catalyst housings 30 as shown in FIGS. 2 and 4. In other embodiments, any number of catalysts 28 and corresponding catalyst housings 30 may be included in the SCR 20.

In the illustrative embodiment, the flow-redirection hosing 34 further includes a doser mount 56 adapted to support a reagent doser 58 coupled to the reagent mixer as shown in FIG. 2. The doser mount 56 is formed to include an aperture 59 that opens into the flow-redirection housing 34. The reagent 26 is discharged from the doser 56 along a doser axis 42 generally parallel with the second axis 50. The aperture 58 is located adjacent to the housing inlet 40 such that the reagent moves through the aperture 59 of the doser mount 56 along the second axis 50 and is carried along at least portions of the second flow axis 48 and the third flow axis 50 defining the U-shape flow path. In this way, the flow-redirection housing 34 provides a desired distance for the reagent to distribute through and mix with the stream of exhaust gases 22 before the stream of exhaust gases 22 is separated into the plurality of fluidly-separate streams 23 by the multi-outlet discharge manifold 36.

The catalyst passages 32 are arranged along axes 33, 35 that are parallel to the third axis 48 as shown in FIG. 6. The axes 33, 35 are spaced equal distances from the third axis 48 so that fluidly-separate streams 23 of equal volume and flow rate enter each of the catalyst housings 30. Additional catalysts 28 and corresponding catalyst housings 30 may be included in the SCR 20 and also arranged along a respective axis that is spaced an equal distance from the third axis 48.

In some embodiments, the SCR may be enclosed in a case and supported within the case by one or more support plates that tie each of the catalyst housings together. SCRs included in these designs are not serviceable and may require disassembling most of the case and the support plates in order to reach the SCR. In the illustrative embodiment, SCR 20 is supported relative to the reagent mixer 24 without any additional structures tying each of the catalysts 28 and/or catalyst housings 30 together. In this way, the multi-outlet discharge manifold 36 removes structures that are included in other embodiments while retaining the function of those structures. The multi-outlet discharge manifold 36 also provides means for coupling the plurality of catalysts housings 30 to the flow-redirection housing 34 while allowing for each of the catalyst housings 30 to be removed individually for service.

The SCR may further include clamps 60 to releasably couple each of the catalyst housings 30 to a respective manifold outlet 54 as shown in FIGS. 2 and 6. The clamps 60 in the illustrative embodiment include a retainer ring 62, a band 64, and a clamp adjustor 66. The retainer ring 62 is optional and engages a lip 68 formed on the catalyst housing and a lip 70 formed on the corresponding manifold outlet 54. The band 64 is wrapped around the retainer ring 62. The clamp adjustor 66 is adjustable to shorten the band 64 around the retainer ring 62 so that the retainer ring 62 holds the catalyst housing 30 and the manifold outlet 54 together. The clamp adjustor 66 may be lengthened so that the band 64 and the retainer ring 62 move out of engagement with the lips 68, 70 and the catalyst housing 30 containing the catalyst 28 can be removed and serviced individually. Any suitable type of clamp adjustor 66 may be used such as, for example, a latch clamp, a toggle clamp, or a screw clamp. Additional clamps 60 may also releasably couple the reagent mixer 24 to the DPF 18 or other treatment devices.

The reagent mixer 24 may further include a plurality of mixing features to enhance mixing of the reagent 26 with the stream of exhaust gases and to direct the stream of exhaust gases along the U-shape flow path as shown in FIG. 6. The plurality of mixing features may include flow-directing fins 74 in the mixing chamber 38 and one or more baffle plates 76. In the illustrative embodiment, the reagent mixer includes a first baffle plate 78 coupled between the multi-outlet discharge manifold 36 and the manifold inlet 52 and a second baffle plate 80 coupled between the manifold inlet 52 and the plurality of manifold outlets 54. The first baffle plate 78 has a circular shape that corresponds with the multi-outlet discharge manifold 36. The second baffle plate 80 has a pair of semi-circular ends 88 interconnected by straight side edges 90.

The first baffle plate 78 and the second baffle plate 80 are each made from a single sheet of metal and are formed to include a plurality of openings as shown in FIGS. 4 and 6. The first baffle plate 78 is formed to include a plurality of circular shaped openings 92 sized to discharge the stream of exhaust gases 22 into the multi-outlet discharge manifold 36 along the third axis 48. The first baffle plate 78 is spaced apart from the second baffle plate 80 to define a plenum 94 therebetween. The stream of exhaust gases 22 are divided into equal streams 23 in the plenum 94. Additional mixing of the reagent 26 and the exhaust gases may be induced in the plenum 94. The streams 23 are discharged through the plurality of manifold outlets 54 through a plurality of openings 96 formed in the second baffle plate 80.

In the illustrative embodiment, the plurality of openings 96 formed in the second baffle plate 80 include a pair of semi-circular shape openings 98, 100 and smaller circular shape openings 102 adjacent to each semi-circular opening 98, 100. Each semi-circular opening 98, 100 opens toward a corresponding catalyst 28. The circular openings 102 are grouped in sets that also open toward a corresponding catalysts 28. The circular openings 102 are radially inward from the semi-circular openings 98, 100 relative to the third axis 48.

The aftertreatment system 14 may further include a multi-inlet manifold 104 coupled to downstream ends of each of the catalyst housings 30 as shown in FIG. 6. The individual streams 23 are rejoined downstream of the SCR 20 in the multi-inlet manifold 104. The multi-inlet manifold 104 includes a plurality of manifold inlets 106, a single manifold outlet 108, and a manifold body 110. Each of the plurality of manifold inlets 106 corresponds with one of the catalyst housings 30. The manifold body 110 defines a retention chamber 112 that receives each of the steams 23. The manifold outlet 108 discharges the exhaust gases out of the aftertreatment system 14 to the atmosphere or to other treatment devices downstream.

The multi-inlet manifold may further include a third baffle plate 114 coupled between the catalyst housings 30 and the plurality of manifold inlets 106. The third baffle plate 114 is made from a single sheet of metal and is substantially similar to the second baffle plate 80.

In some embodiments, the present disclosure provides a low cost and serviceable parallel SCR aftertreatment system. The illustrative embodiment may allow the SCRs to be accessed and serviced. The present disclosure may use the reagent mixer 24 to provide an ammonia (NH3) solution (or urea) to multiple SCR catalysts in parallel by either splitting the flow downstream of the reductant injection and mixing the NH3 in split outlet paths, or completely mixing NH3 with exhaust flow first and then splitting the mixture into multiple paths and guided to each SCR. The split path downstream version may be adapted for 3, 4, or more SCRs in parallel.

Figure 7:
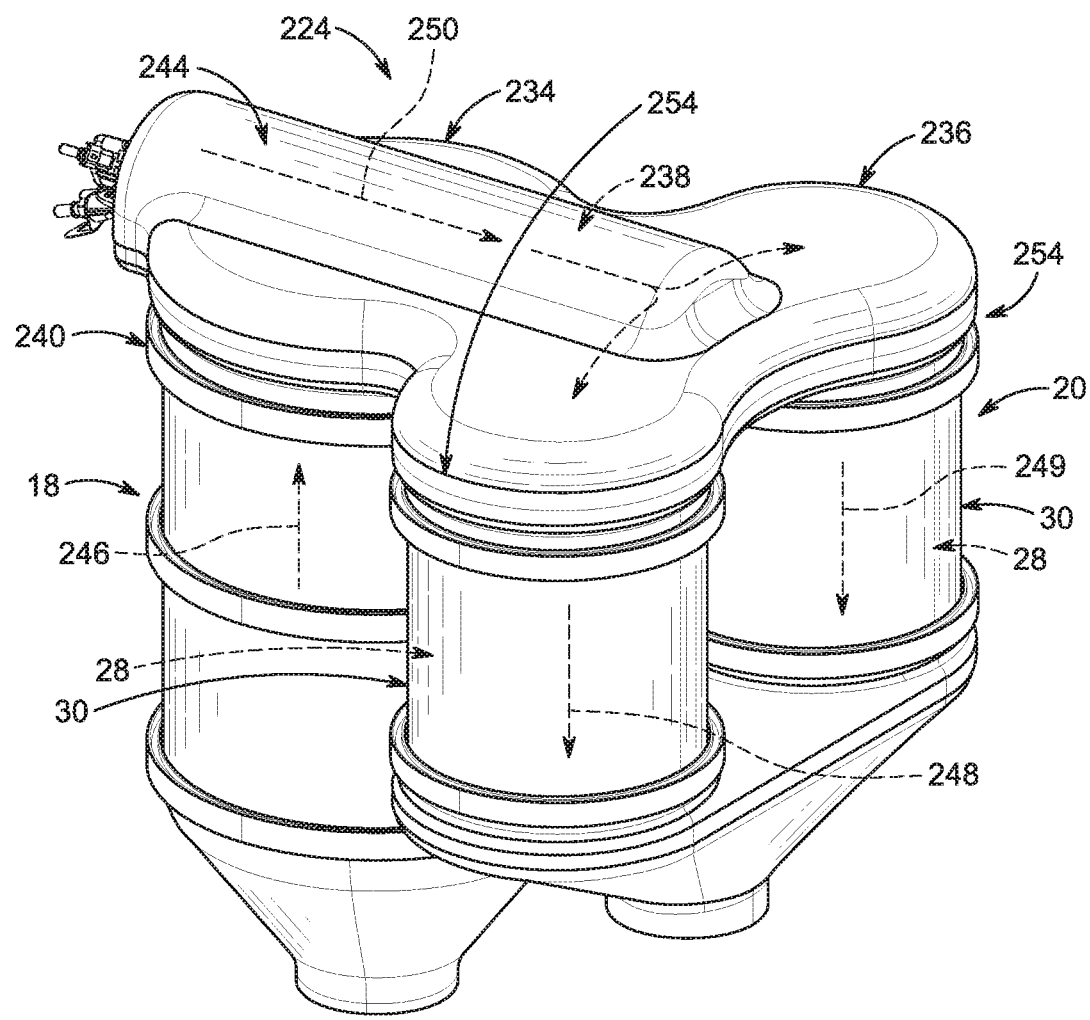
FIG. 7 is a perspective view of the aftertreatment system with another embodiment of a reagent mixer with a multi-outlet discharge manifold.

Another illustrative embodiment of a reagent mixer 224 for use with the aftertreatment system 14 is shown in FIG. 7. The reagent mixer 224 is similar to reagent mixer 24. Accordingly, reference numbers in the 200 series are used to describe similar features to those shown in FIGS. 1-6 and described above regarding reagent mixer 24. The disclosure of reagent mixer 24 above is incorporated by reference herein for reagent mixer 224.

The reagent mixer 224 includes a flow-redirection housing 234 and a multi-outlet discharge manifold 236 as shown in FIG. 7. The flow-redirection housing 234 is formed to include a mixing chamber 238. The multi-outlet discharge manifold 236 interconnects the flow-redirection housing 234 and each of the catalyst housings 30. The reagent 26 is mixed with the stream of exhaust gases in the mixing chamber 238 before being conducted to the SCR 20 by the multi-outlet discharge manifold 236. The multi-outlet discharge manifold 236 is configured to separate the stream of exhaust gases into a plurality of streams that equals the number of catalysts 28 and catalyst housings 30.

The flow-redirection housing 234 includes a housing inlet 240 and a housing body 244 as shown in FIG. 7. The stream of exhaust gases are directed into the mixing chamber 238 through the housing inlet 240 generally along a first axis 246. The reagent is injected into the mixing chamber 238 directly adjacent to where the stream of exhaust gases enters the mixing chamber 238. The stream of exhaust gases and the reagent are mixed in the mixing chamber 238 and then discharged from the multi-outlet discharge manifold 236 generally along a third axis 248 and a fourth axis 249. The third axis 248 and the fourth axis 249 are spaced apart from and parallel with the first axis 246. The housing body 244 extends generally along a second axis 250 that is perpendicular to the first axis 246, the third axis 248, and the fourth axis 249.

The reagent mixer 224 provides a U-shape flow path when viewed from the side, as shown in FIG. 7. The U-shape flow path extends from the housing inlet 240 to the multi-outlet discharge manifold 236 and is defined by the first, second, third and fourth axes 246, 250, 248, 249, and/or in the directions of axes 246, 250, 248, 249. Providing a U-shape flow path minimizes package space in the vehicle 10 while the multi-outlet discharge manifold 236 allows each catalyst 28 in the SCR 20 in the illustrative embodiment to be serviced individually.

The multi-outlet discharge manifold 236 includes a plurality of manifold outlets 254 configured to separate the stream of exhaust gases into the plurality of fluidly-separate streams. Each of the plurality of manifold outlets 254 is coupled to a corresponding catalyst housing 30. Each of the plurality of manifold outlets 254 is generally in line with the housing body 244 of the flow-redirection housing 234 relative to the second axis 250 such that they cooperate with the flow-redirection housing 234 to define the mixing chamber 238. Each of the plurality of manifold outlets 254 is at least partially offset from the housing body 244 on each side of the second axis 250.

In the illustrative embodiment, the multi-outlet discharge manifold 236 includes two manifold outlets 254 that correspond with the catalysts 28 and catalyst housings 30. In some embodiments, the multi-outlet discharge manifold 236 includes more than two manifold outlets 254 such that the exhaust gases and reagent are discharged from the multi-outlet discharge manifold 236 along additional axes.

The following numbered clauses include embodiments that are contemplated and non-limiting:

Clause 1. A reagent mixer adapted for use in an exhaust aftertreatment system associated with an internal combustion engine, the reagent mixer comprising a flow-redirection housing including a housing inlet configured to receive a stream of exhaust gases along a first flow axis and a housing body that extends from the housing inlet along a second flow axis perpendicular to the first axis, and a multi-outlet discharge manifold that includes a manifold inlet coupled to the housing body to receive the stream of exhaust gases discharged from the housing body along a third axis that is parallel with the first axis and a plurality of manifold outlets configured to separate the stream of exhaust gases into a plurality of fluidly-separate streams, wherein the first flow axis, the second flow axis, and the third flow axis are arranged to define a U-shape flow path, and wherein the flow-redirection housing further includes a doser mount adapted to support a reagent doser coupled to the reagent mixer and formed to include an aperture that opens into the flow-redirection housing, the aperture being shaped to receive a reagent discharged from the doser generally along the second axis perpendicular to both the first flow axis and the third flow axis, and the aperture being located adjacent to the housing inlet such that reagent that moves through the aperture of the doser mount along the third axis would be carried along at least portions of the second flow axis and the third flow axis defining the U-shape flow path in order to provide a desired distance for the reagent to distribute through and mix with the stream of exhaust gases before the stream of exhaust gases is separated into the plurality of fluidly-separate streams by the multi-outlet discharge manifold.

Clause 2. The reagent mixer of any other suitable clause or combination of clauses, wherein the plurality of manifold outlets are shaped to discharge each of the plurality of streams along associated stream axes that are parallel with the third flow axis.

Clause 3. The reagent mixer of any other suitable clause or combination of clauses, wherein each of the associated stream axes are spaced equally from the third flow axis.

Clause 4. The reagent mixer of any other suitable clause or combination of clauses, wherein the aperture is located such that reagent that moves through the aperture of the doser mount along the second flow axis would be carried along most of the U-shape flow path.

Clause 5. The reagent mixer of any other suitable clause or combination of clauses, wherein the multi-outlet discharge manifold further includes a baffle plate made from a single sheet of metal and formed to include a plurality of openings and the plurality of openings include a pair of semi-circular shape openings and smaller circular shape openings adjacent to each semi-circular opening, and wherein one of the semi-circular openings and a set of circular openings corresponding to each of the manifold outlets.

Clause 6. The reagent mixer of any other suitable clause or combination of clauses, wherein each set of circular openings are arranged radially inward from each corresponding semi-circular opening relative to the third flow axis.

Clause 7. An exhaust aftertreatment system comprising
a reagent mixer including (a) a flow-redirection housing including a housing inlet configured to receive a stream of exhaust gases along a first flow axis and a housing body that extends from the housing inlet along a second flow axis perpendicular to the first axis, and (b) a multi-outlet discharge manifold that includes a manifold inlet coupled to the housing body to receive the stream of exhaust gases discharged therefrom along a third axis spaced apart from and generally parallel with the first axis, and a plurality of manifold outlets configured to separate the stream of exhaust gases into a plurality of manifold streams, wherein the first flow axis, the second flow axis, and the third flow axis are arranged to define a U-shape flow path,
a doser coupled to the reagent mixer and configured to inject a reagent along a doser axis into the reagent mixer along the U-shape flow path, and
a selective catalytic reduction unit that includes a plurality of catalysts and a plurality of catalyst housings, each catalyst housing defining a passage in fluid communication with one of the plurality of manifold streams that receives one of the catalysts of the plurality of catalysts so that each catalyst is fluidly-separate from other catalysts in the selective catalytic reduction unit,
wherein each of the catalyst housings is removably coupled with a corresponding one of the plurality of manifold outlets so that each of the catalysts can be separated individually from the selective catalytic reduction unit and serviced.

Clause 8. The reagent mixer of any other suitable clause or combination of clauses, wherein the flow the doser axis is perpendicular to the first flow axis and the third flow axis.

Clause 9. The reagent mixer of any other suitable clause or combination of clauses, wherein the doser is located adjacent to the housing inlet such that reagent discharged from the doser along the doser axis would be carried along at least portions of the second flow axis and the third flow axis defining the U-shape flow path in order to provide a desired distance for the reagent to distribute through and mix with the stream of exhaust gases before the stream of exhaust gases is separated by the multi-outlet discharge manifold.

Clause 10. The reagent mixer of any other suitable clause or combination of clauses, wherein the selective catalytic reduction unit further includes a plurality of clamps to releasably mount each of the catalyst housings to a respective manifold outlet.

Clause 11. An over the road vehicle comprising
a combustion engine configured to combust fuel and produce a stream of exhaust gases discharged through an exhaust passageway and
an exhaust aftertreatment system including:
a reagent mixer including (a) a flow-redirection housing including a housing inlet configured to receive a stream of exhaust gases along a first flow axis and a housing body that extends from the housing inlet along a second flow axis, and (b) a multi-outlet discharge manifold that includes a manifold inlet coupled to the housing body to receive the stream of exhaust gases discharged therefrom along a third axis spaced apart from and generally parallel with the first axis, and a plurality of manifold outlets configured to separate the stream of exhaust gases into a plurality of manifold streams, wherein the first flow axis, the second flow axis, and the third flow axis are arranged to define a U-shape flow path,
a doser coupled to the reagent mixer and configured to inject a reagent along a doser axis into the reagent mixer along the U-shape flow path, and
a selective catalytic reduction unit that includes a plurality of catalysts and a plurality of catalyst housings, each catalyst housing defining a passage in fluid communication with one of the plurality of manifold streams that receives one of the catalysts of the plurality of catalysts so that each catalyst is fluidly-separate from other catalysts in the selective catalytic reduction unit,
wherein each of the catalyst housings is removably coupled with a corresponding one of the plurality of manifold outlets so that each of the catalysts can be separated individually from the selective catalytic reduction unit and serviced.

The invention claimed is:
1. A reagent mixer adapted for use in an exhaust aftertreatment system associated with an internal combustion engine, the reagent mixer comprising
a flow-redirection housing including a housing inlet configured to receive a stream of exhaust gases along a first flow axis and a housing body that extends from the housing inlet along a second flow axis perpendicular to the first axis, and
a multi-outlet discharge manifold that includes a manifold inlet coupled to the housing body to receive the stream of exhaust gases discharged from the housing body along a third axis that is parallel with the first axis and a plurality of manifold outlets configured to separate the stream of exhaust gases into a plurality of fluidly-separate streams, wherein the first flow axis, the second flow axis, and the third flow axis are arranged to define a U-shape flow path, and wherein the flow-redirection housing further includes a doser mount adapted to support a reagent doser coupled to the reagent mixer and formed to include an aperture that opens into the flow-redirection housing, the aperture being shaped to receive a reagent discharged from the doser generally along the second axis perpendicular to both the first flow axis and the third flow axis, and the aperture being located adjacent to the housing inlet such that reagent that moves through the aperture of the doser mount along the third axis would be carried along at least portions of the second flow axis and the third flow axis defining the U-shape flow path in order to provide a desired distance for the reagent to distribute through and mix with the stream of exhaust gases before the stream of exhaust gases is separated into the plurality of fluidly-separate streams by the multi-outlet discharge manifold.

2. The reagent mixer of claim 1, wherein the plurality of manifold outlets are shaped to discharge each of the plurality of streams along associated stream axes that are parallel with the third flow axis.

3. The reagent mixer of claim 2, wherein each of the associated stream axes are spaced equally from the third flow axis.

4. The reagent mixer of claim 1, wherein the aperture is located such that reagent that moves through the aperture of the doser mount along the second flow axis would be carried along most of the U-shape flow path.

5. The reagent mixer of claim 1, wherein the multi-outlet discharge manifold further includes a baffle plate made from a single sheet of metal and formed to include a plurality of openings and the plurality of openings include a pair of semi-circular shape openings and smaller circular shape openings adjacent to each semi-circular opening, and wherein one of the semi-circular openings and a set of circular openings corresponding to each of the manifold outlets.

6. The reagent mixer of claim 5, wherein each set of circular openings are arranged radially inward from each corresponding semi-circular opening relative to the third flow axis.

7. An exhaust aftertreatment system comprising
a reagent mixer including (a) a flow-redirection housing including a housing inlet configured to receive a stream of exhaust gases along a first flow axis and a housing body that extends from the housing inlet along a second flow axis perpendicular to the first axis, and (b) a multi-outlet discharge manifold that includes a manifold inlet coupled to the housing body to receive the stream of exhaust gases discharged therefrom along a third axis spaced apart from and generally parallel with the first axis, and a plurality of manifold outlets configured to separate the stream of exhaust gases into a plurality of manifold streams, wherein the first flow axis, the second flow axis, and the third flow axis are arranged to define a U-shape flow path,
a doser coupled to the reagent mixer and configured to inject a reagent along a doser axis into the reagent mixer along the U-shape flow path, and
a selective catalytic reduction unit that includes a plurality of catalysts and a plurality of catalyst housings, each catalyst housing defining a passage in fluid communication with one of the plurality of manifold streams that receives one of the catalysts of the plurality of catalysts so that each catalyst is fluidly-separate from other catalysts in the selective catalytic reduction unit, wherein each of the catalyst housings is removably coupled with a corresponding one of the plurality of manifold outlets so that each of the catalysts can be separated individually from the selective catalytic reduction unit and serviced.

8. The exhaust aftertreatment system of claim 7, wherein the flow the doser axis is perpendicular to the first flow axis and the third flow axis.

9. The exhaust aftertreatment system of claim 7, wherein the doser is located adjacent to the housing inlet such that reagent discharged from the doser along the doser axis would be carried along at least portions of the second flow axis and the third flow axis defining the U-shape flow path in order to provide a desired distance for the reagent to distribute through and mix with the stream of exhaust gases before the stream of exhaust gases is separated by the multi-outlet discharge manifold.

10. The exhaust aftertreatment system of claim 1, wherein the selective catalytic reduction unit further includes a plurality of clamps to releasably mount each of the catalyst housings to a respective manifold outlet.

11. An over the road vehicle comprising
a combustion engine configured to combust fuel and produce a stream of exhaust gases discharged through an exhaust passageway and
an exhaust aftertreatment system including:
a reagent mixer including (a) a flow-redirection housing including a housing inlet configured to receive a stream of exhaust gases along a first flow axis and a housing body that extends from the housing inlet along a second flow axis, and (b) a multi-outlet discharge manifold that includes a manifold inlet coupled to the housing body to receive the stream of exhaust gases discharged therefrom along a third axis spaced apart from and generally parallel with the first axis, and a plurality of manifold outlets configured to separate the stream of exhaust gases into a plurality of manifold streams, wherein the first flow axis, the second flow axis, and the third flow axis are arranged to define a U-shape flow path,
a doser coupled to the reagent mixer and configured to inject a reagent along a doser axis into the reagent mixer along the U-shape flow path, and
a selective catalytic reduction unit that includes a plurality of catalysts and a plurality of catalyst housings, each catalyst housing defining a passage in fluid communication with one of the plurality of manifold streams that receives one of the catalysts of the plurality of catalysts so that each catalyst is fluidly-separate from other catalysts in the selective catalytic reduction unit,
wherein each of the catalyst housings is removably coupled with a corresponding one of the plurality of manifold outlets so that each of the catalysts can be separated individually from the selective catalytic reduction unit and serviced.

* * * * *